June 8, 1926.

F. STEFANICH 1,587,613

NONSKID ATTACHMENT FOR AUTOMOBILES

Filed August 29, 1925

INVENTOR
Frank Stefanich
BY Percy S. Webster
ATTORNEY

Patented June 8, 1926.

1,587,613

UNITED STATES PATENT OFFICE.

FRANK STEFANICH, OF FRESNO, CALIFORNIA.

NONSKID ATTACHMENT FOR AUTOMOBILES.

Application filed August 29, 1925. Serial No. 53,240.

This invention relates to improvements in devices for preventing lateral side slipping or skidding of the rear wheels of an automobile, and particularly represents an improvement over that type of device shown in my copending application for patent filed May 5th, 1924, Serial No. 711,108.

In my previous device two ground engaging discs were provided, rigidly connected together and arranged to be lowered to the ground as a unit.

With this form of construction, if one disc encountered an obstruction in the path of forward movement of the vehicle (which movement of course continues even though side skidding is taking place) the other disc would be raised from the ground also. This would temporarily destroy all non-skidding action of both discs.

The principal object of the present invention therefore is to mount each disc in such a manner that while both discs are raised or lowered simultaneously, one disc if meeting an obstruction, will be able to give and clear itself from such obstruction without affecting the other disc, which will remain in proper engagement with the ground.

At no time therefore do I lose all the effectiveness of my non-skid arrangement unless two obstructions are encountered at the very same moment, which of course is extremely unlikely.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
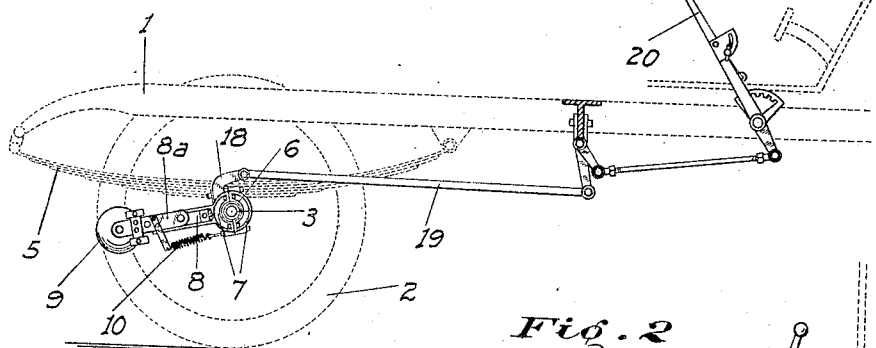
Fig. 1 is a side elevation in section of my non-skid attachment as applied to an automobile, with the discs in their raised or neutral positions.

Referring now more particularly to the characters of reference on the drawings, the numeral 1 denotes the main side frames of an automobile having rear wheels 2 between which are the usual axle and differential housings 3 and 4 respectively, the former being supported by the usual springs 5.

My non-skid attachment comprises bearing sleeves 6 fixed on the axle housings just inwardly of the springs. Turnable on the sleeve are collars 7 formed of two sections split horizontally to enable the same to be mounted on the sleeves.

Depending from the lower collar sections are rigid arm members 8. Pivotally mounted on the arms 8 and depending therebelow are additional arms 8ª arranged to support ground engaging discs 9. The length of the two arm sections when in longitudinal alinement with each other is such that when they are in a downward position with the discs engaging the ground, said arms will have a slight slope toward the rear from their upper ends.

Figure 2:
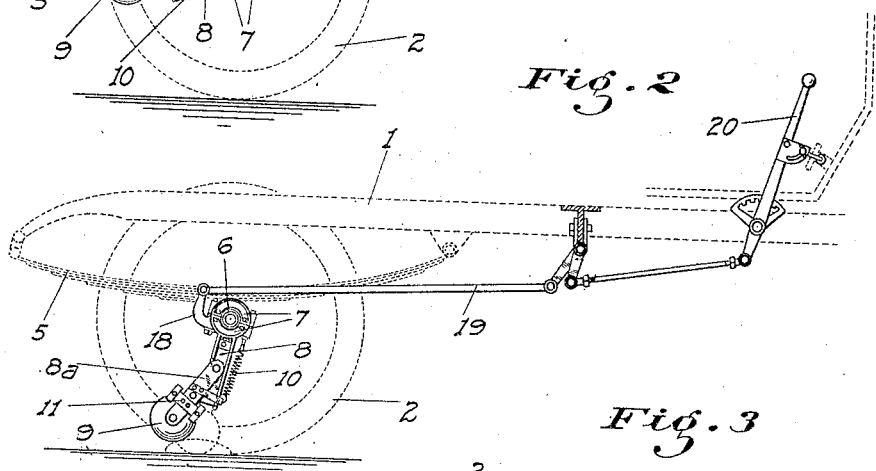
Fig. 2 is a similar view with the discs lowered to the ground, and showing the movement of one disc when encountering an obstruction.
Figures 3, 4, 5:
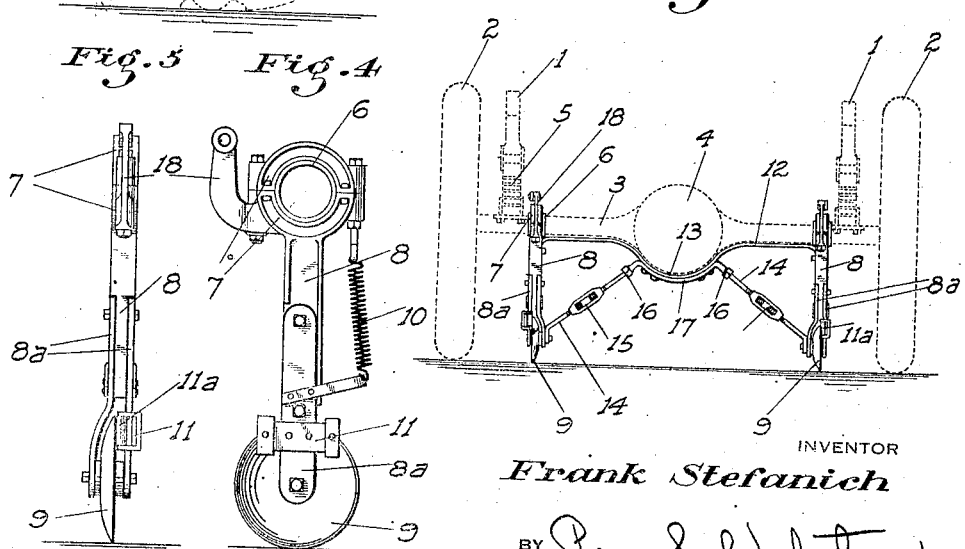
Fig. 3 is a rear end view of the attachment.
Fig. 4 is a side view enlarged, of a disc and its supporting arm structure.
Fig. 5 is a rear end view of the same.

The arms 8ª are arranged to turn on their pivots only to the rear, as shown in Fig. 2. I preferably attain this result by forming the upper arm members of I section with the rear flanges cut away below the pivotal connection of the lower arms. Said lower arms comprise transversely spaced members pivoted together onto the central web of the arms 8 so that the discs may be mounted therebetween and will therefore have two spaced bearings. Normally therefore the arms 8ª abut against the forward flanges of the arms 8 and cannot turn forwardly. This construction is plainly shown in Fig. 2.

A tension spring 10 connects the two portions of each arm on the forward side thereof, said spring tending to hold the arm sections in straight alinement and resisting the turning of the lower portion on its pivot. The arm sections therefore normally form a single unit moving together as one.

To brace the discs against lateral deflection when the same are engaged with the ground during a side skidding action of the car I mount a plate 11 on the outer one of each lower arm member, said plate extending horizontally beyond the sides of said arm. Turnably supported by said plate at the outer ends thereof are vertical rollers 11ª adapted to engage the edges of the disc at spaced points. This arrangement takes the place of the single ball device employed in the structure of the previous application and is more efficient for the purpose.

To brace said arms together to form a rigid unit practically proof against lateral deflection or breakage, they are connected adjacent their upper ends by a transverse bar 12, which is suitably curved intermediate its ends as at 13 to pass about and clear the differential housing 4. Diagonal braces 14 extend from the curved section of the bar 12 to the arms 8ª adjacent the disc spindles.

The braces 14 each consist of two sections, connected by a turnbuckle 15 so that the corresponding arm 8ª may be held in proper lateral alinement and without any binding strain being placed on the pivot.

The upper ends of the braces have swivel connections with the bar 12, such as by means of ball and socket joints indicated at 16. The socket members of these joints are secured to the ends of a strap 17, which in turn is secured to the curved portion 13 of the bar 12 between said joints. To prevent the possibility of any binding when the lower portions of the arms and the diagonal braces turn, the joints 16 are located in vertical and transverse alinement with the pivots of the arm sections.

To raise and lower the discs, the arms 8 have extensions 18 projecting above the bearings 6. To the upper ends of these arms are connected horizontal rods 19 whose longitudinal movement is controlled by an operating lever 20 mounted in the driver's compartment of the car.

The particular construction and arrangement of this operating mechanism is preferably the same as shown in the above mentioned co-pending application, hence there appears no need of going into the same in detail in this case.

In operation when the lever 20 is suitably manipulated, the arm units are turned on their bearings 6 so as to be swung downwardly toward the ground, until the discs 9 engage the ground. Any tendency of the vehicle to skid laterally is therefore overcome.

If one disc encounters an obstruction in the path of longitudinal movement of the vehicle as indicated in Fig. 2, the lower arm section 8ª of the corresponding disc will break rearwardly at its pivot, the spring 10 being then placed in tension.

The brace 14 associated therewith will of course move with the lower portion of said arm turning at the joint 16. The disc may therefore clear the obstruction without affecting the other arm unit or disc and without straining or moving the operating mechanism.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A non-skid attachment for vehicles including arm members pivotally mounted onto the vehicle adjacent its rear end, ground engaging members on the lower ends of the arms, means for normally holding the arms upwardly to the rear of their pivotal connections and for lowering the same simultaneously at will, whereby the ground engaging members may be engaged with the ground, said arms being formed in sections transversely hinged together and arranged to break only to the rear, and means for each arm resisting such breaking.

2. A non-skid attachment for vehicles including arm members pivotally mounted onto the vehicle adjacent its rear end, ground engaging members on the lower ends of the arms, means for normally holding the arms upwardly to the rear of their pivotal connections and for lowering the same simultaneously at will, whereby the ground engaging members may be engaged with the ground, said arms being formed in sections transversely hinged together and arranged to break only to the rear, and a spring for each arm between the sections thereof arranged to resist such breaking action.

3. A non-skid attachment for vehicles including arm members pivotally mounted onto the vehicle adjacent its rear end, ground engaging members on the lower ends of the arms, means for normally holding the arms upwardly to the rear of their pivotal connections and for lowering the same simultaneously at will, whereby the ground engaging members may be engaged with the ground, said arms being formed in sections transversely hinged together and arranged to break only to the rear, a spring for each arm between the sections thereof arranged to resist such breaking action, a transverse brace between the upper portions of the arms, diagonal braces between said transverse brace and the lower arm sections, and swivel connections between said diagonal and transverse braces disposed in alinement with said arm hinges.

4. A non-skid attachment for vehicles including arm members pivotally mounted onto the vehicle adjacent its rear end, ground engaging members on the lower ends of the arms, means for normally holding the arms upwardly to the rear of their pivotal connections and for lowering the same simultaneously at will, whereby the ground engaging members may be engaged with the ground, a transverse brace between the arms adjacent their upper ends, and movable as a unit therewith diagonal braces between said transverse brace and the lower ends of the arms, and turnbuckles in said diagonal braces.

In testimony whereof I affix my signature.

FRANK STEFANICH.